No. 776,991. PATENTED DEC. 6, 1904.
E. BLUE.
NUT LOCK.
APPLICATION FILED MAY 11, 1904.
NO MODEL.
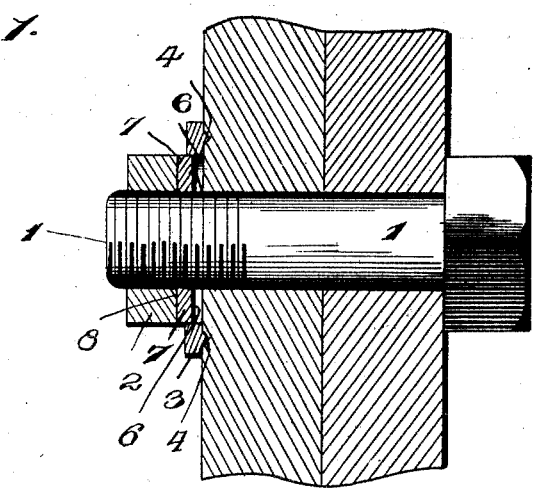
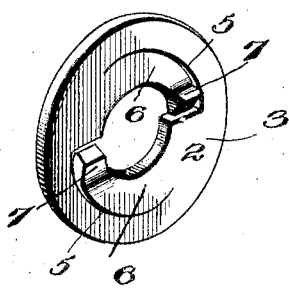
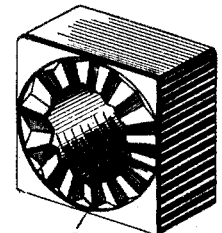
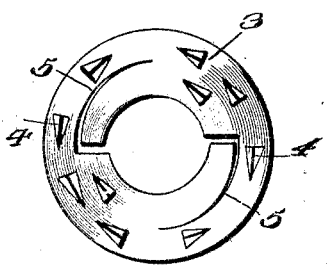
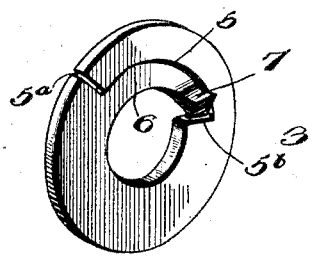
Inventor
E. Blue
Witnesses
By
R. A. B. Lacey, Attorneys No. 776,991. Patented December 6, 1904.

UNITED STATES PATENT OFFICE.

EDGAR BLUE, OF GARVIN, INDIAN TERRITORY.

NUT-LOCK.

SPECIFICATION forming part of Letters Patent No. 776,991, dated December 6, 1904.

Application filed May 11, 1904. Serial No. 207,452. (No model.)

*To all whom it may concern:*

Be it known that I, EDGAR BLUE, a citizen of the United States, residing at Garvin, Choctaw Nation, Indian Territory, have invented certain new and useful Improvements in Nut-Locks, of which the following is a specification.

This invention relates to improvements in lock devices for securing nuts to bolts to prevent accidental displacement of the same when in use.

The invention involves a peculiar form of lock-washer adapted to engage the nut positively in preventing unscrewing of this member, and the interlocking connection between the washer and nut is such that the nut will normally be held in position, at the same time being adapted to be readily removed by the application of force.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a longitudinal vertical sectional view. Fig. 2 is a perspective view of the washer looking toward the upper side thereof. Fig. 3 is a bottom plan view of the washer. Fig. 4 is a perspective view of the nut. Fig. 5 is a detail perspective view embodying a modification.

Corresponding and like parts are referred to in the following description and indicated in all the views of the drawings by the same reference characters.

My nut-lock is susceptible of use in securing nuts to bolts upon machinery, rail-joints, bridgework, or in other places where the parts secured are likely to receive more than the ordinary amount of vibration or jar.

Describing the essential parts of my invention, the numeral 1 designates the bolt, which is of any type now in common use, the nut 2 being adapted to screw upon the threaded end of the bolt 1 in the ordinary manner. The lock member consists of a washer 3, which is interposed between the nut and the side of the adjacent part against which the nut is usually adapted to bind. In its application to rail-joints, for instance, the washer 3 would be disposed intermediate the nut 2 and the fish-plate, and the outer side of the washer 3 is fixed so that same cannot rotate, by means of projections 4, extended from the bottom side thereof, which projections may be pointed, so as to positively grip against or engage the part against which the nut forces the washer. The projections 4 are preferably of triangular form, as shown most clearly in Fig. 3 of the drawings. The lock-washer 3 is provided with curved cuts or slits 5 adjacent the peripheral portion of the opening thereof, and these cut or slit portions 5 form the lock or engaging tongues 6, which latter are secured to the body of the washer and are adapted to have a spring action in their coöperation with the nut 2, with which they engage. The tongues 6 are preferably two in number, though, as shown in the modified construction in Fig. 5, a single tongue also may be utilized. The tongues 6 are provided at the end portions thereof with teeth 7, and the tooth 7 of each tongue is preferably of V form in cross-section, or, in other words, this tooth is beveled in opposite direction.

The construction of the engaging or biting tooth 7 of each engaging tongue is advantageous in that the spring action of the tongues 6 is sufficient to hold the teeth 7 positively in engagement with the nut 2, which latter is provided upon its under side with a plurality of coöperating teeth 8, surrounding the opening in the said nut. The positive engagement of the teeth 7 of the tongue 6 with the teeth 8 of the nut 2 is sufficient to prevent unscrewing of the nut under ordinary conditions of service. However, owing to the peculiar formation of the teeth 7—namely, the beveled structure thereof—the nut is adapted to be unscrewed readily by application of an engaging or similar implement. The tongues 6 gradually taper toward the ends thereof provided with the teeth 7, the above being instrumental in securing a maximum degree of spring action of the said tongue and the teeth against the nut.

In the modification illustrated in Fig. 5 the washer is specifically the same form as shown in the other figures of the drawings. However, a single tongue 6 is formed in the body of this washer. The modified form of the lock-washer is preferably used in connection with rail-joints and bridge structures. However, it will be understood that the invention is susceptible of use in various ways, as hereinbefore mentioned. As shown in Fig. 5, a slit 5ª extends outwardly from one end of the spring-tongue 6 to the outer peripheral portion of the washer. This slit gives the necessary spring action to the tongue 6. A second slit 5ᵇ extends inwardly from the opposite end of the tongue 6 to the peripheral portion of the opening in the washer, and the end of the tongue adjacent the slit 5ᵇ is provided with the V-shaped tooth 7. The outer portion of the washer, adjacent the slit 5, coöperates to give a maximum degree of spring action to the tongue 6, as will be readily apparent.

Having thus described the invention, what is claimed as new is—

In a nut-lock, the combination of the bolt 1, the nut 2 provided upon its under side with the engaging teeth 8, the lock-washer 3 provided with the curved slit 5 adjacent the peripheral portion of the openings therein, the curved slit 5ª extending outwardly from one end of the slit 5, the slit 5ᵇ extending inwardly from the opposite end of the slit 5, the aforesaid slits forming the spring-tongue 6, and the V-shaped tooth 7 carried by the end of the spring-tongue 6 adjacent to the slit 5ᵇ, said V-shaped tooth coöperating with the teeth 8 of the nut aforesaid.

In testimony whereof I affix my signature in presence of two witnesses.

EDGAR BLUE. [L. S.]

Witnesses:
AARON W. MOSELEY,
JACK ALLEN.